US008285559B1

(12) United States Patent
Rowley

(10) Patent No.: US 8,285,559 B1
(45) Date of Patent: *Oct. 9, 2012

(54) METHOD FOR PROVIDING PERSONALIZED MEDICAL CARE

(75) Inventor: William W. Rowley, Chagrin Falls, OH (US)

(73) Assignee: Healthnetwork Foundation, Inc., Chagrin Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/947,478

(22) Filed: Nov. 16, 2010

Related U.S. Application Data

(63) Continuation of application No. 11/756,720, filed on Jun. 1, 2007, now Pat. No. 7,835,923, which is a continuation-in-part of application No. 10/621,479, filed on Jul. 15, 2003, now abandoned.

(51) Int. Cl.
*G06Q 10/00* (2012.01)
(52) U.S. Cl. .............................. 705/2; 705/1
(58) Field of Classification Search ................ 705/2
See application file for complete search history.

(56) References Cited

U.S. PATENT DOCUMENTS

| 2,411,224 | A | 10/1946 | O'Reilly |
| 4,464,800 | A | 8/1984 | Edwards |
| 4,774,723 | A | 10/1988 | Ruck |
| 5,029,342 | A | 7/1991 | Stein et al. |
| 5,619,754 | A | 4/1997 | Thurwanger et al. |
| 6,035,451 | A | 3/2000 | Burns et al. |
| 6,151,581 | A | 11/2000 | Kraftson et al. |
| 6,185,739 | B1 | 2/2001 | Verkic et al. |
| 6,735,569 | B1 | 5/2004 | Wizig |
| 2002/0038233 | A1 | 3/2002 | Shubov et al. |
| 2002/0194022 | A1 | 12/2002 | Comite |
| 2003/0182413 | A1 | 9/2003 | Allen et al. |
| 2004/0093231 | A1* | 5/2004 | Walz ................................ 705/1 |

OTHER PUBLICATIONS

Pulaski, Michael J., "Market Medical Services to the Affluent"; MGM Journal, vol. 44, issue 5, Medical Group Management Association, Sep. 1997; http://www.mjpulaski.com/marketing_to_the_affluent.htm.*
Article: Pulaski, Michael J., "An Emerging Niche Market Opportunity"; MGM Journal, Issue 4, Medical Group Management Association; Jul.-Aug. 1997, p. 69, 72-74, 76, V. 44, Mar. 22, 2010.
Article: Pulaski, Michael J., "Marketing Medical Services to the Affluent"; MGM Journal, Issue 5, Medical Group Management Association; Sep.-Oct. 1997, p. 26, 28, 30, V. 44, Mar. 22, 2010.
Website: "The Executive Registry"; http://www.executiveregistry.org, The Executive Registry, 535 E. 68th Street, Box 114, New York, NY 10021 USA, 2001.
Website: "PinnacleCare," http://www.pinnaclecare.com, PinnacleCare International Inc., 250 West Pratt Street, Suite 1100, Baltimore, MD 21201, 2009.

* cited by examiner

*Primary Examiner* — Hiep V Nguyen
(74) *Attorney, Agent, or Firm* — Hahn Loeser & Parks, LLP

(57) ABSTRACT

A method for providing personalized medical care is described herein. The membership provider provides access to qualified members to highly qualified healthcare facilities. A dedicated staff person is available for the members, along with a selection of preferred services to make the health care facility visit more pleasant. The membership provider will then facilitate a meeting between the healthcare facility and the member to encourage and solicit a donation by the member to the healthcare facility.

17 Claims, 3 Drawing Sheets

METHOD FOR PROVIDING PERSONALIZED MEDICAL CARE

TECHNICAL FIELD

The invention relates generally to a method of medical treatment, and more particularly to treatment limited to members of groups, and more particularly to personalized medical care received at the nation's top hospitals by members of a specific group, and even more particularly to tying this treatment to arrangements for donations to the hospitals.

BACKGROUND OF THE INVENTION

It is known to provide a network of medical centers to provide personalized access to emergency and routine care twenty-four hours a day, seven days a week. For example, The Executive Registry, offered by The University Hospitals of Columbia and Cornell, includes twenty-four hour access to medical care worldwide, global emergency transportation, hospital assistance services including coordination of routine and emergency in-patient admission, out-patient care, second opinion, and follow up care, pre-departure services such as medical consultations, travel inoculations, and compulsory immunizations, physician consultative services for members who are hospitalized in a non-Executive Registry facility, referral to specialists at network hospitals, and relocation health care planning for executives and their families who relocate abroad.

Although The Executive Registry offers some of the same services offered by the present invention, the present invention adds much more, and meets certain needs not contemplated by The Executive Registry.

SUMMARY OF THE INVENTION

The present invention relates to a method for providing personalized medical care wherein a non-profit organization coordinates necessary medical care for certain qualified individuals while also providing a mechanism for these certain qualified individuals to make monetary and other contributions to the medical facility responsible for the qualified individual's medical care. The non-profit membership organization will commonly be a separate entity from the associated healthcare facilities, allowing the non-profit membership provider to retain objectivity as to the criteria for admitting members and choosing associated healthcare providers. The inventive process described herein is intended to provide premier service to members of a non-profit organization. In return, the desire is that these individuals, who in one embodiment of this invention are high net worth individuals, such as Presidents and CEOs of companies or other executives of organizations, will fund the critical research and development programs going at the various healthcare facilities, thereby provided a desired service, while funding much needed medical research. It is foreseen that the individuals will fund these critical research and development programs through generous monetary and other types of contributions to the medical facility that has provided them with the individualized medical care. One goal of the process is to provide the top leaders of the world with access to the top hospitals. Over time this bond becomes a win-win situation for both groups. The leaders receive the best available health care and the hospitals develop a relationship with the individual and families who can help fund the needed research and development to improve health care for everyone. The individuals that receive the benefit of the personalized medical care are given the opportunity to give back to society as well as the medical institution that provided them with the increased level of service by providing monetary donations and other contributions that will allow for research and development to advance the medical treatment for the particular disease or other condition that the individual has suffered from or otherwise desires to contribute.

In accordance with one aspect of the present invention, a method for specialized service at an associated healthcare facility, the facility having at least one healthcare provider, includes the steps of choosing the associated healthcare facility based upon at least one quantitative rating system, wherein only the associated healthcare facilities in approximately 20% of the rating system are chosen, providing a membership provider, the membership provider being a separate non-profit entity from the associated healthcare facility, providing at least one membership to at least one potential member with the membership being limited to certain quantitative and or qualitative requirements, charging a membership fee, providing at least one dedicated staff person, wherein the staff person is at least partially supported by the non-profit membership provider, offering preferred services to the qualified member, performing at least one medical procedure on the member, conducting at least one satisfaction survey with the member, arranging at least one meeting between at least one satisfied member and at least one officer of the associated healthcare facility for the purpose of facilitating donations and contributions from the qualified member to the healthcare facility for research, development and other purposes, tracking donations given by the at least one satisfied member, and soliciting further donations to the associated healthcare facility from at least one satisfied member.

In accordance with another aspect of the present invention the at least one dedicated staff person has at least one dedicated work area, wherein the staff person is dedicated exclusively to the qualified member.

In accordance with still another aspect of the present invention, the cost of the at least one dedicated staff person may be supported exclusively or partially by the non-profit membership provider and the dedicated staff person is an employee of the associated healthcare facility.

In accordance with yet another aspect of the present invention, the preferred services are chosen from the group comprising: pick up from an airport, pick up from a train station, pick up from a port, pick up via automobile, concierge services, dedicated waiting room, personal accompaniment to appointments, specialized menu options, preregistration at both the hospital and the hotel, special room assignments, and dedicated examination room.

In accordance with another aspect of the present invention, the method further includes arranging initial meeting at the associated healthcare facility.

In accordance with another aspect of the present invention, the method further includes informing the associated healthcare facility of donations given by satisfied members.

In accordance with still another aspect of the present invention, the method further includes maintaining a database of participating qualified healthcare facilities and updating the database.

In accordance with another aspect of the present invention, the method further includes preparing at least one gift for the at least one healthcare provider.

In accordance with another aspect of the present invention the method further includes creating multiple access levels, wherein more of the preferred services are offered for the higher access levels, and charging higher membership fees and or soliciting more frequent and or larger donations for qualified members to access the higher access levels.

In accordance with another aspect of the present invention, the method further includes soliciting larger and or more frequent donations from members who have had positive experiences and exemplary service.

In accordance with another aspect of the present invention, a method for providing personalized medical care includes choosing at least one hospital considered to be in the top ten overall or in the top ten of a particular specialty, the choice being made using quantitative criteria, providing at last one membership, staffing hospital with at least one dedicated staff person to assist at least one member in obtaining the personalized medical care, offering preferred services to the at least one qualified member, and soliciting donations for the hospital from at least one satisfied member.

In accordance with another aspect of the present invention, choosing at least one hospital considered to be in the top ten overall or in the top ten of a particular specialty, the choice being made using quantitative criteria further includes the steps of choosing at least one hospital considered to be in the top ten overall or in the top ten of a particular specialty, the choice being made utilizing quantitative criteria, the choice being made utilizing an electronic database of hospitals, and electronically sorting through the available hospitals to determine the top ten in each category.

In accordance with another aspect of the present invention, the method further includes providing an electronic feedback form to the at least one qualified member, receiving the feedback from the at least one qualified member, storing the feedback in a database, and sorting the feedback based upon access level, member, hospital, and service rendered.

In accordance with another aspect of the present invention, soliciting donations for the hospital from at least one satisfied member further includes the step of electronically soliciting donations for the hospital from at least one satisfied member based on the feedback.

In accordance with another aspect of the present invention, the method further includes providing electronic identification cards, the cards encoded with a password, the cards containing personal information regarding the member, including personal medical information, the card including the member's access level.

In accordance with another aspect of the present invention, the method further includes allowing the qualified member to choose a specific physician upon arrival at the associated healthcare facility.

In accordance with another aspect of the present invention, a method of obtaining donation opportunities for at least one healthcare facility, includes the steps of providing a dedicated staff person, offering a membership based upon quantitative or qualitative requirements, offering preferred services to qualified members, obtaining feedback from at least one member with respect to the services provided by the healthcare facility, and soliciting donations from satisfied members to the healthcare facility for research, development and other programs.

In accordance with another aspect of the present invention, the method further includes setting a standard procedure at each of the at least one healthcare facilities, the procedure dealing with contacting the hospital, transportation to and from the hospital, greeting the member, waiting areas, feedback request forms, donation request forms, examination rooms, and staffing.

In accordance with another aspect of the present invention, the method further includes securing access to a specific group of physicians for the at least one qualified member, upon the member's arrival.

In accordance with another aspect of the present invention, the method further includes creating multiple access levels, wherein more of the preferred services are offered for the higher access levels.

Still other benefits and advantages of the invention will become apparent to those skilled in the art to which it pertains upon a reading and understanding of the following detailed specification.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The preferred embodiment of the invention, illustrative of the best mode in which applicant has contemplated applying the principals is set forth in the following description and is shown in the drawings and is particularly and distinctly pointed out and set forth in the appended claims. The invention may take physical form in certain parts and arrangements of parts, numerous embodiments of which will be described in detail in the specification. and illustrated in the accompanying drawings which form a part hereof, and wherein:

DETAILED DESCRIPTION OF THE INVENTION

Figure 1:
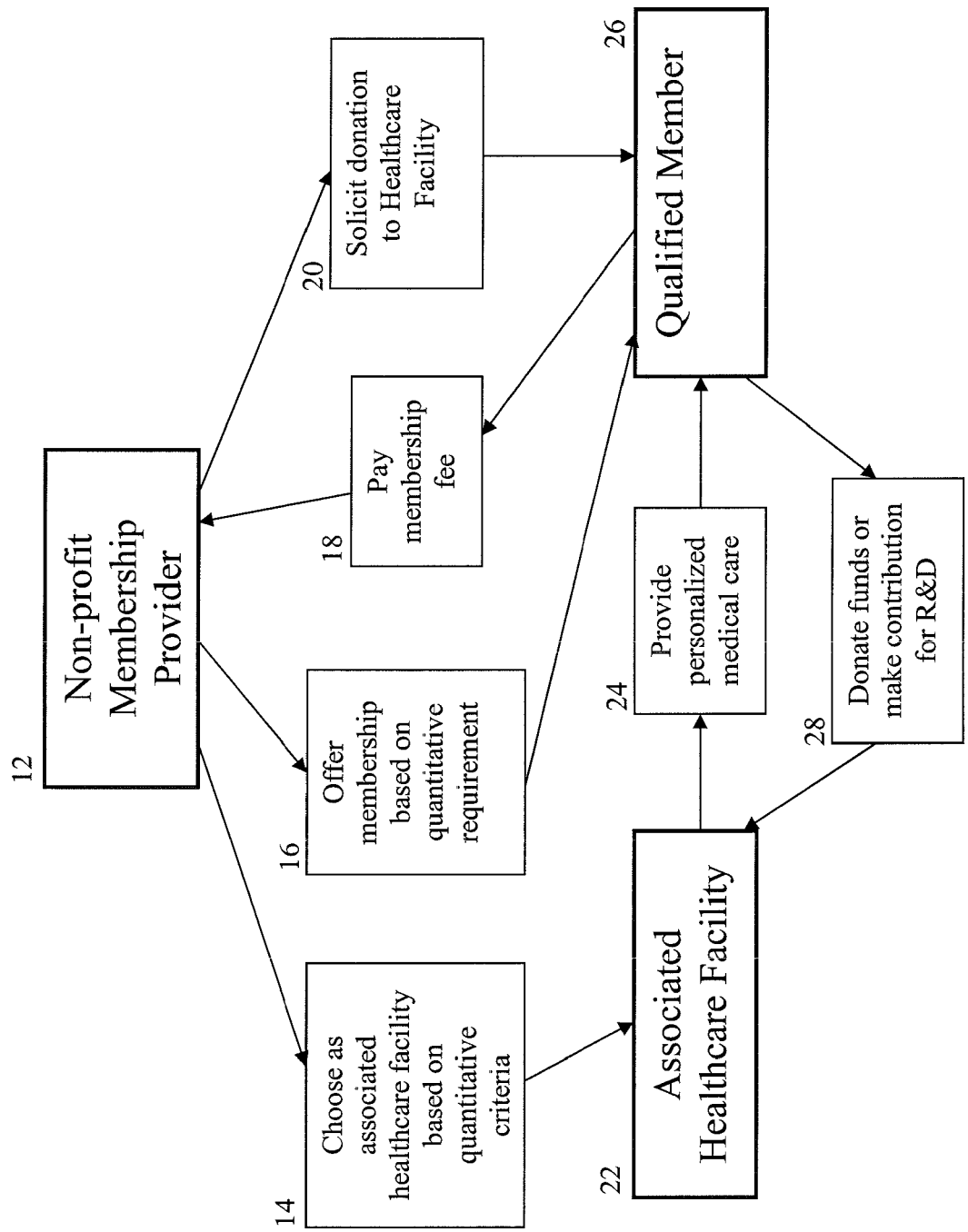
FIG. 1 is a block diagram illustrating a preferred embodiment of the present invention.

Referring now to the drawings wherein the showings are for purposes of illustrating various embodiments of the invention only and not for purposes of limiting the same, the figures illustrate the novel idea of a method for providing personalized medical care.

The method of this invention is illustrated in the block diagram shown as FIG. 1. There is provided a method for providing personalized, medical care for members of non-profit organization 12. Membership to the non-profit organization is restricted to certain qualified members 26 wherein the qualified members are chosen through quantitative and or qualitative requirements 16, such as job title and/or job responsibilities, income, or net worth. In this particular embodiment of the invention, the membership to the non-profit organization will be limited such that members will be owners, executives, and presidents of businesses, corporations and other organizations. In further embodiments of the invention it is foreseen that membership may be by invitation only with members being screened and investigated prior to the issuance of an invitation for membership being issued to the potential qualified member. However, it is to be understood that this invention is applicable to any group with a defined membership and who have the capability of supporting an individual at a healthcare facility. Qualified members 26 will commonly be required to pay a membership fee 18 to become members of non-profit membership provider 12.

The people taking advantage of the membership in the present invention are generally individuals whose time is in short supply, and people who are used to premier facilities and treatment. Because of this, in this particular embodiment of the invention, non-profit membership provider 12 chooses hospitals and other healthcare or medical facilities 22 based upon quantitative criteria 14, which allows the non-profit membership provider 12 to ensure that qualified members 26 are receiving only the best care. The criteria can be based upon the hospital itself, and the reputation it carries, or a particular specialty within that hospital, or other healthcare facility. For example, U.S. News & World Reports® publishes an annual issue dealing with the best hospitals in America. This provides an excellent source for determining which hospitals to add to the membership package. The particular criteria used to determine which hospitals are best is not important to this invention, and it is to be understood that any method that has quantitative measurements, ensuring top quality, can be used. The non-profit membership organization will commonly be a separate entity from the associated healthcare facilities, allowing the non-profit membership provider to retain objectivity as to the criteria for admitting members and choosing associated healthcare providers.

In this particular embodiment, only hospitals that place in the top twenty hospitals in the country will be considered for inclusion. Of course it is to be understood that the number twenty is not intended to limit the invention in any manner, and that any number of hospitals, chosen using sound business judgment could be used. Once the method for determining which healthcare facilities meet the qualifications desired by the non-profit membership provider, someone from the non-profit membership provider contacts the qualified healthcare facility with respect to be a listed hospital in the inventive program. A top decision maker at the healthcare facility is introduced to the inventive program and how it can benefit their facility. If a hospital decides to join the program, that hospital is then added to the data base of available hospitals to which the qualified members of the inventive program can go. The hospital would be entered into a database based upon location, ranking, and any specialties. This information will then be used to match qualified members with the care they need or desire.

Figure 2:
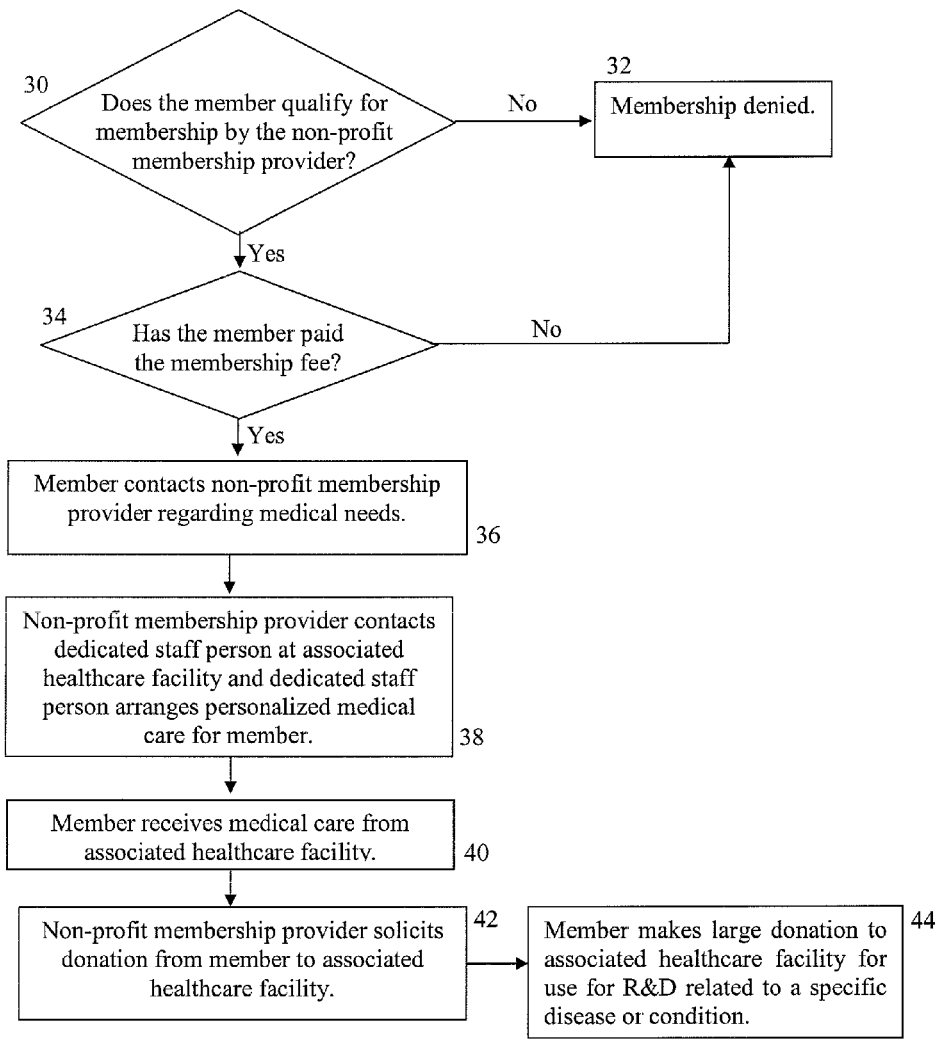
FIG. 2 is a flow chart illustrating an embodiment of the present invention.

As illustrated through the flowchart at FIG. 2, it is also foreseen that the member may request a specific healthcare provider. Member's requests will be accommodated as possible throughout the method of this invention. If the desired healthcare provider meets the requirements to become an associated healthcare provider with the non-profit membership provider, the desired health care provider may be added as an associated healthcare provider. The member will then be matched with the desired health care provider for the necessary medical treatment.

In a preferred embodiment, the membership provider chooses a dedicated staff person to operate the non-profit membership providers' office located within that hospital. It is to be understood that the dedicated staff person may work part-time for the hospital doing other work, may be a full-time employee of the hospital, etc. Any arrangement can be used, as long as chosen using sound business judgment, that allows access by the members to a staff person at the hospital. This staff person will be trained for the inventive program, along with being made aware of the profile of a typical member. The staff person is preferably an individual familiar with the hospital and the other hospital staff members. The membership provider will train the staff person to accommodate the individuals, how to respond quickly to members, and about the members. The membership provider will also train the development and financial department at the hospital how best to track members. The hospital will be thoroughly researched and interviewed to determine the particular specialties and amenities available at that hospital. The database will be updated with any relevant information.

Continuing with this embodiment of the invention, the dedicated staff person is supported by the membership provider, although any financial arrangement between the healthcare facility and the membership provider can be utilized, as long as chosen using sound business judgment. For example, the hospital could pay the salary of the dedicated staff person and the membership provider could reimburse the hospital, the membership provider could pay all or a portion of the salary of the staff person, or the hospital and the membership provider could split the cost of the staff person.

The initial setup, in this embodiment, of the inventive method entails creating a separate system and structure within the healthcare facility that is only accessible by members of the membership provider. As way of example, but not intended to have a limiting effect, 1) a separate office wherein the dedicated staff person is located would be set up at the facility; 2) separate, private waiting rooms; 3) phone lines accessible only by members; 4) separate food and drink menus; 5) transportation to and from the healthcare facility (i.e. limousine ride from the airport, pick up member at their house or hotel, etc.); 6) concierge services; 7) 24-hour pages; 8) personal digital assistances; and 9) individuals to accompany the member to their appointments. As mentioned above, these amenities are only examples of preferred services offered to members, and are not intended to limit the invention in any manner. Any preferred services can be used and offered.

Along with the preferred services and dedicated staff person, this particular embodiment of the invention includes a list of dedicated physicians who will be available for medical treatment and/or medical consultation for the members.

Once the hospital is included, and the various staff and services are in place, one example of the process of the inventive method would be as follows. In this embodiment, the members are owners, presidents, or high level executives in companies, or other dignitaries. It is to be understood that the membership type is not intended to limit the invention in any manner, as long as some requirement for membership exists. For example, the membership requirements and restrictions may allow a member may sponsor one of their employees. If a qualified member has a particular medical need, or has a medical examination required, the qualified member will either contact the non-profit membership provider, or utilize a global computer network to access the non-profit membership provider. The member will enter the particular medical problem or need they need addressed, as well as their profile information. This request will then be processed by the membership provider, and the options will be presented for the member to choose.

Once the member chooses a qualified healthcare facility (it is also possible that the member simply wishes to speak with someone at the non-profit membership provider), the member request is forwarded to the dedicated staff person at the chosen healthcare facility. The staff person would then contact the member to find out precisely what the member desires and start the process to direct the member to the right area or department of the healthcare facility. Once the appropriate area or department has been determined, the staff person will then arrange a time for the member to come in, or to have the member brought in, or for the members information to be sent in for a second opinion. The staff person then pre-registers the member at a hotel, if necessary, and at the hospital. The staff person can also arrange for transportation for the member. The member is met at the hospital and is conducted, in person, everywhere they go in the hospital, if they so desire. The staff person also arranges for medical records transfers and exit interviews after the appointment.

When the member arrives, the member identifies himself with a membership card, and the staff person fills out all of the necessary paper work. The member is then directed to the private waiting area, where the preferred services are available. When the time for the appointment or procedure arrives, a dedicated individual, who may be the dedicated staff person, takes the member directly to the medical examination room, or medical procedure room, if the member desires. It is possible to include in this inventive method, separate and private medical examination and procedure rooms as well. The member will then be treated or examined by a healthcare provider 24 (in FIG. 1). The dedicated individual will then return to bring the member out of the room and make sure that everything met with the member's approval. The dedicated staff person will fill out a report of the visit and submit this information to the membership provider.

The non-profit membership provider will provide the member with an evaluation form to ensure that everything was to his liking. The membership provider will process the feedback from the member and enter that information into the database. If appropriate, the membership provider will send a gift to any healthcare provider or staff member who provided exceptional service. Another benefit to the health care facility is that the non-profit membership provider will arrange for health care providers to attend conferences, seminars, and other functions attended by members. This will enable the healthcare facility to have another opportunity to obtain funding and/or advantageous relationships. In return for attending the seminar free of charge, the healthcare provider agrees to meet with the members to answer any medical questions they may have, in private or group consultations.

In this particular embodiment, the inventive method has varying degrees of memberships. Different levels of membership (i.e. silver, gold, platinum) would have different associated benefits, and different associated membership fees and donation expectations.

The non-profit membership provider may contact any member who responded positively to their experience. The membership provider will then encourage and or solicit the qualified member to donate money or other assets or make other contributions to the hospital or healthcare facility that provided the medical services to the member 20 (in FIG. 1). It is foreseen that the donation requested by the non-profit membership provider made by the qualified member to the healthcare facility will be at least equal to, and in many cases will greatly exceed the actual cost of the services provided to the member by the healthcare facility 28. For example, if the cost of the services provided by the healthcare facility to the member were approximately $2,500, the non-profit membership provider may solicit a donation or contribution of $5,000 or more from the member to be made to the healthcare facility. The membership requirements and restrictions provide for qualified members that commonly give donations of such a large value, and that are willing and able to make such donations to the healthcare facility that provided them with what they see as exemplary personalized services.

It is further foreseen that the non-profit membership provider may solicit donations for as well. If the member indicates their willingness to donate money or make other contributions to the healthcare facility, the non-profit membership provider will arrange for a meeting between the member and the appropriate personnel at the healthcare facility. In this particular embodiment, the donations and other contributions solicited from satisfied members is intended to be directed to research and development or other hospital programs, for example those that are geared towards education and or awareness of various diseases and conditions.

The non-profit membership organization's facilitation of member donations to the qualified hospital or healthcare facility provides the unique benefit of furthering research, education and other beneficial goals related to providing for cures for, the elimination of, and or a reduction of certain diseases and conditions. The qualified members of the non-profit membership organization are given the opportunity to give back to the community and the healthcare facility for the individualized service they have received. The method of the present invention allows individuals that receive the benefit of the personalized medical care to give back to society as well as the medical institution that provided them with the increased level of service by providing monetary donations and other contributions that will allow for research and development to advance the medical treatment for the particular disease or other condition that the individual has suffered from or otherwise desires to contribute. The donations will commonly be used to further treatment and R&D related to rare diseases that are commonly known as orphaned diseases, such as but not limited to Bardet-Biedl Syndrome, Alstrom Syndrome, and Meckel-Gruber Syndrome, to name a few. Without donations to further research and development many rare and orphaned diseases would never be cured.

The feedback received, and any donations given by satisfied members, can be communicated to the hospital by the non-profit membership provider, so that the hospital can be made aware of the benefits of the inventive program.

Example 1

The following is a specific example of how one embodiment of the invention could work. John Smith, the chief executive officer of ABC, Inc. has recently determined that he has non-Hodgkin's B-cell lymphoma. Naturally, he is concerned, and wishes to have the best available treatment. Mr. Smith has been a member of the non-profit membership provider for three and one-half years, and holds a platinum membership, with an attendant cost of $1,000 per year for the associated benefits with that membership level.

Mr. Smith contacts the membership provider and provides the person with the relevant information regarding his diagnosis, medical history, geographic location, etc. Previously that year, the membership provider had added the Cleveland Clinic to its list of healthcare facilities. After reviewing Mr. Smith's file, and his condition, the membership provider offers all options to Mr. Smith. He then decides which qualified healthcare facility he will visit.

The membership provider contacts the dedicated staff person, Ms. Jones, at the Cleveland Clinic. Ms. Jones is given the relevant information regarding Mr. Smith, including his diagnosis, his medical history, and his membership information. Ms. Jones then contacts Mr. Smith at his home in Palo Alto, Calif. Ms. Jones arranges Mr. Smith's travel plans to Cleveland, including a limousine to pick Mr. Smith up at the airport, and transport him to the Cleveland Clinic. Ms. Jones also pre-registers Mr. Smith at his hotel and at the Cleveland Clinic.

Mr. Smith arrives in Cleveland, and the limousine takes Mr. Smith to the Cleveland Clinic. Mr. Smith proceeds to the membership provider office and meets Ms. Jones. Ms. Jones checks Mr. Smith into the hospital and directs him to a private room. The room has a television, DVD player, stereo, minibar, and an extensive food menu. The room also has a laptop computer and fax machine in case Mr. Smith needs to conduct business. Mr. Smith has chosen to see Dr. Argyle, and Ms. Jones contacts Dr. Argyle to set up an appointment. Dr. Argyle usually has a five-month wait for an appointment. However, by working with Dr. Argyle's schedule, making Mr. Smith's plans flexible, Dr. Argyle agrees to add an appointment (after the appointment, Dr. Argyle is given a gift to thank him for making the special accommodation). In thirty minutes, Dr. Argyle is ready to see Mr. Smith. The examination is conducted in a private room, dedicated solely for the use of members. Dr. Argyle reviews Mr. Smiths chart, examines him, and sets up a battery of tests that would normally be run the following week. However, due to Ms. Jones relationship with the hospital, she arranges all appointments for the next day. After the appointment, Ms. Jones has Mr. Smith's limousine waiting for him to take him to the hotel. The room arrangements have been made by Ms. Jones.

Ms. Jones fills out a report log on Mr. Smith's visit and sends the information to the membership provider. The membership provider processes, the information and generates a feedback questionnaire for Mr. Smith. This questionnaire is forwarded to Mr. Smith. Upon his return home, the questionnaire is waiting in his e-mail inbox. Mr. Smith was delighted with his experience and fills out the questionnaire accordingly. Mr. Smith gives particular praise to Ms. Jones. Mr. Smith transmits his completed questionnaire to the membership provider.

The membership provider reviews the feedback and orders a large bouquet of flowers to be sent to Ms. Jones for the exceptional job that she did. A bottle of wine is also sent along to Dr. Argyle. If Mr. Smith is pleased with the service he received, the membership provider will contact him three to nine months afterward to ask Mr. Smith for a small donation to the non-profit membership provider. The membership provider also encourages Mr. Smith to make some type of donation to the Cleveland Clinic. Mr. Smith is more than happy to do this, so the membership provider sets up a videoconference between Mr. Smith and Mr. Henry, the chief financial adviser of the Cleveland Clinic. Mr. Smith and Mr. Henry meet, and Mr. Smith agrees to donate $5,000 to the Cleveland Clinic to help build a new children's cancer ward. Had this been Mr. Smith's second, third, fourth, etc. visit, the membership provider may approach him for a larger donation.

In one embodiment of this invention, the non-profit membership provider contacts the hospital to discuss details of schedules and working with the dedicated staff person who knows the internal workings of the hospital. This enables qualified members of the non-profit membership organization to obtain quick appointments with the desired physician. It also enables members to avoid certain doctors and other staff personnel for whatever reason. The staff person, in this embodiment, will create an inventory of personnel, particularly doctors, to determine ones who have provided members with service with which the members have been satisfied.

In this particular embodiment of the invention, the process utilizes computers and the global computer network to facilitate efficiency and rapid response times. The ranking of the hospitals is done via a computer algorithm, and e-mail is used to communicate between the members, the membership provider, and the healthcare facility. However, it is to be understood, that the use of computer technology is not essential to the functionality of the inventive process.

In another embodiment of this invention, one of the membership levels could include use by family members of the qualified members of the non-profit membership provider, or includes the ability to bequeath the membership in a will. It is to be understood, however, the particular types of memberships, and the total number of available memberships, are merely embodiments of this invention, and are not intended to limit it in any manner. Any number of type of memberships could be used, as long as chosen using sound business judgment using some quantitative and or qualitative requirements or restrictions for membership.

In another embodiment of this invention, the membership provider could provide the member with the ability to choose which healthcare facility they wish to visit A questionnaire could be posted on a global computer network, asking the member specific questions to address their medical needs. The inventive program would analyze the input from the member and list the available healthcare facilities which fit the member's profile. The inventive process could also categorize the facilities by geography, specialty and ranking. The process could also list the relevance order of the facilities. The process would also allow the member to search through all of the facilities available on the list. The member could then choose one of the facilities and enter their selection. In one embodiment, the process would then ask the members which of the available preferred services they would like to take advantage of, as well as a list of available doctors at that facility. Also in this embodiment, the member's personal medical records, contact information, donation information can be accessed via electronic media through the membership card. This electronic membership card could carry all of the member's information.

The method of a certain embodiment of the invention is illustrated by the flowchart of FIG. 2. A potential member will be evaluated to determine if they qualify for membership by the non-profit membership provider, as shown in step 30. If the member does not qualify for membership, the member is denied, as shown at 32. If the member qualifies for membership, the member is required to pay a membership fee, as shown in step 34. The member contacts the non-profit membership provider regarding the member's medical needs, as shown in step 36. The non-profit membership provider contacts the dedicated staff person at the associated healthcare facility and the dedicated staff person arranges personalized medical care for the member, shown at 38. The member receives medical care from the associated healthcare facility, as shown at 40. The non-profit membership provider solicits donations from the member to the associated healthcare facility, as shown in step 42. The member makes a large donation to the associated healthcare facility for use for research and development related to a specific disease or condition of the member's choice, shown at 44.

Figure 3:
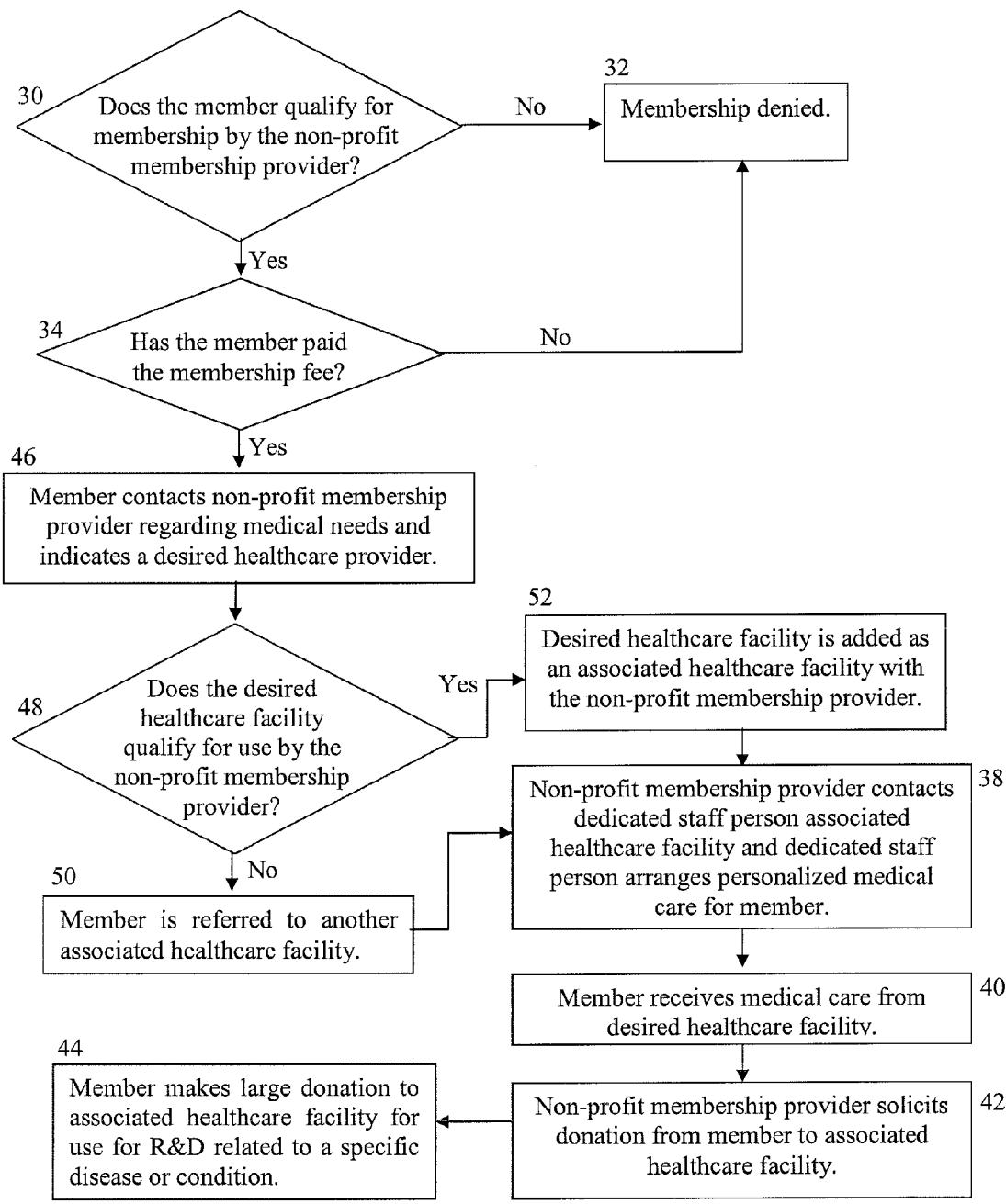
FIG. 3 is a flow chart illustrating another embodiment of the present invention.

FIG. 3 illustrates a flowchart of a further embodiment of the invention at hand, similar to the above flowchart, but wherein the member requests a desired medical provider. When the member requests a specific medical provider, as shown in 46, the desired healthcare facility is examined to determine if it meets the requirements to be an associated healthcare facility, as shown in step 48. If the desired healthcare facility does not meet the requirements to be an associated health care facility the member may be referred to another associated health care facility as shown in 50. However, it is foreseen that the requirements to become an associated healthcare facility may include an exception for healthcare facilities specifically requested by qualified members. If this is the case the desired healthcare facility may become an associated healthcare facility within the requirements. If the desired healthcare facility meets the requirements, it is added as an associated healthcare facility, as shown in 52.

The invention has been described with reference to at least one embodiment. Obviously, modifications and alterations will occur to others upon a reading and understanding of this specification. It is intended to include all such modifications and alternations in so far as they come within the scope of the appended claims or the equivalence thereof.

In the foregoing description, certain terms have been used for brevity, clearness, illustration and understanding; but no unnecessary limitations are to be implied therefrom beyond the requirements of the prior art, because such terms are used for descriptive purposes and are intended to be broadly construed. Moreover, this invention has been described in detail with reference to specific embodiments thereof, including the respective best modes for carrying out each embodiment. It shall be understood that these illustrations are by way of example and not by way of limitation.

What is claimed is:

1. A method of providing personalized medical care, the method comprising the steps of:
   providing a membership provider,
   providing memberships to one or more high net worth potential members as determined by the membership provider, wherein the potential members are chosen based upon at least one requirement for membership into the membership provider, the at least one requirement comprising financial worth,
   providing an electronic database containing independent healthcare organizations to be offered to at least one of said members for providing personalized medical care,
   searching the database using criteria including member's medical need and at least one quantitative rating system and identifying a selection of said independent healthcare organizations from said electronic database with a specialty of said independent healthcare organizations corresponding to said member's medical need and said at least one quantitative rating system using a computer algorithm choosing only healthcare organizations in approximately the top 20% of the rating system,
   displaying to said member the selection of said independent healthcare organizations corresponding to said member's medical need arranged by one or more of geography, specialty and ranking,
   receiving from the member identification of a selected healthcare facility chosen from facilities in the selection of independent healthcare organizations,
   staffing the selected healthcare facility with a dedicated staff person trained for the program, wherein the membership provider at least partially supports the dedicated staff person, offering preferred services to the member,
   providing personalized medical care to the member, wherein the medical procedure is performed on the member by the selected healthcare facility, wherein the dedicated staff person assists the member in obtaining the personalized medical care from the healthcare facility, and optionally,
   soliciting a donation from the member for one selected from the group consisting of the selected healthcare facility, the membership provider, research and development related to a specific disease or condition of the member's choice, and a combination thereof.

2. The method of providing personalized medical care according to claim 1, the step of providing a membership provider comprises a non-profit membership provider.

3. The method of providing personalized medical care according to claim 1, the step of searching a database further comprises using criteria based on geography and specialty.

4. The method of providing personalized medical care according to claim 1, further comprising:
   charging a membership fee for the member's participation with the membership provider.

5. The method of providing personalized medical care according to claim 1, further comprising the step of:
   conducting at least one satisfaction survey with the member.

6. The method of providing personalized medical care according to claim 1, further comprising the step of:
   arranging at least one meeting between the member and the healthcare facility.

7. The method of providing personalized medical care according to claim 1, further comprising the step of
   tracking donations given to said selected healthcare facility by said member.

8. The method of providing personalized medical care according to claim 1, wherein
   said solicited donation is of a value in excess of the value of said medical procedure provided to said member by said healthcare facility.

9. The method of providing personalized medical care according to claim 1, wherein the at least one dedicated staff person has at least one dedicated work area, wherein the staff person is dedicated exclusively to the member.

10. The method of providing personalized medical care according to claim 1, wherein the preferred services are chosen from the group comprising:
    pick up from the airport, pick up from a train station, pick up from a port, pick up via automobile, concierge services, dedicated waiting room, personal accompaniment to appointments, specialized menu options, pre-registration at a hotel, preregistration at the healthcare facility, and dedicated examination room.

11. The method of providing personalized medical care according to claim 1, further comprising the step of:
    informing the associated healthcare facility of financial donations given by satisfied members.

12. The method of providing personalized medical care according to claim 1, further comprising the steps of:
    maintaining an electronic database of participating healthcare facilities; and updating the database.

13. The method of providing personalized medical care according to claim 1, further comprising the step of:
    preparing at least one gift for the at least one healthcare provider.

14. The method of providing personalized medical care according to claim 1, further comprising the steps of:
    creating multiple access levels, wherein more of the preferred services are offered for the higher access levels; and
    charging higher membership fees for the higher access levels.

15. The method of providing personalized medical care according to claim 5, further comprising the step of:
    soliciting larger donations from members who have had exemplary service.

16. The method of providing personalized medical care according to claim 1, further comprising the step of:
    providing electronic identification cards, the cards encoded with a password, the cards containing personal information regarding the member, including medical records
    and donation history, the card including the member's access level.

17. The method of providing personalized medical care according to claim 1, further comprising the step of:
    allowing the member to choose a specific physician upon arrival at the healthcare facility.

* * * * *